US008300872B2

(12) United States Patent
Liitola et al.

(10) Patent No.: US 8,300,872 B2

(45) Date of Patent: Oct. 30, 2012

(54) METHOD AND DEVICE FOR DETECTING A DISPLACEMENT AND MOVEMENT OF A SOUND PRODUCING UNIT OF A WOOFER

(75) Inventors: Toni Liitola, Tampere (FI); Tapani Ritoniemi, Tampere (FI); Pekka Seppä, Suodenniemi (FI)

(73) Assignee: VLSI Solution Oy, Tampere (FI)

( * ) Notice: Subject to any disclaimer, the term of this patent is extended or adjusted under 35 U.S.C. 154(b) by 834 days.

(21) Appl. No.: 12/356,582

(22) Filed: Jan. 21, 2009

(65) Prior Publication Data

US 2009/0190789 A1 Jul. 30, 2009

(30) Foreign Application Priority Data

Jan. 17, 2008 (EP) .................................... 08150346

(51) Int. Cl.
*H04R 1/02* (2006.01)
*H04R 29/00* (2006.01)
*H04R 3/00* (2006.01)
*H04R 1/40* (2006.01)
*H04B 3/00* (2006.01)
*H04B 5/00* (2006.01)

(52) U.S. Cl. .............. 381/387; 381/59; 381/77; 381/79; 381/96; 381/97

(58) Field of Classification Search .................... 257/59, 257/77, 79, 96, 97, 387; 381/59, 77, 79, 381/96, 97, 387
See application file for complete search history.

(56) References Cited

U.S. PATENT DOCUMENTS

| | | | | | |
|---|---|---|---|---|---|
| 4,451,928 | A | * | 5/1984 | Murayama | 381/86 |
| 4,497,981 | A | * | 2/1985 | House | 381/182 |
| 4,545,249 | A | * | 10/1985 | Matay | 73/597 |
| 4,619,342 | A | * | 10/1986 | Buck | 181/184 |
| 4,720,867 | A | * | 1/1988 | Imai et al. | 381/86 |
| 4,860,370 | A | * | 8/1989 | Grosbard | 381/403 |
| 5,295,194 | A | * | 3/1994 | Christensen | 381/190 |

(Continued)

FOREIGN PATENT DOCUMENTS

CN 1173105 2/1998

(Continued)

OTHER PUBLICATIONS

European Patent Office Search Report, dated Jun. 8, 2005, issued in connection with counterpart EP Application No. 08150346.8.

*Primary Examiner* — Ida M Soward
(74) *Attorney, Agent, or Firm* — Venable LLP; Eric J. Franklin

(57) ABSTRACT

A system for adjusting a response of a loudspeaker system. The system includes a woofer installed in a housing. The woofer includes a woofer cone. A transmitter for transmitting an ultrasonic audio signal towards the woofer cone. A receiver for receiving the ultrasonic audio signal. A detection unit for determining the position of the woofer cone on the basis of a difference between the phase of the reflected ultrasonic audio signal with respect to the ultrasonic audio signal transmitted from the transmitter. A control unit for adjusting a spring constant of the membrane of the loudspeaker system on the basis of the determined position. A method for adjusting a response of a loudspeaker system, to a module to be used in the system. A computer program product including computer code for adjusting a response of the loudspeaker system.

26 Claims, 8 Drawing Sheets

U.S. PATENT DOCUMENTS 5,325,439 A * 6/1994 Smiley .......................... 381/399
5,444,194 A * 8/1995 Reinke .......................... 181/150
5,635,686 A * 6/1997 Fenton .......................... 181/144
5,673,329 A * 9/1997 Wiener .......................... 381/160
5,952,619 A * 9/1999 Kantor et al. .................. 181/150
6,077,224 A * 6/2000 Lang et al. ..................... 600/437
7,121,756 B2 * 10/2006 Wright et al. .................. 403/128
7,219,873 B2 * 5/2007 Harwood ....................... 248/519
7,315,627 B1 * 1/2008 Cox et al. ...................... 381/353
7,483,338 B2 * 1/2009 Drouin et al. .................. 367/137
7,529,376 B2 * 5/2009 Konagai .......................... 381/97
7,551,749 B2 * 6/2009 Rosen et al. ................... 381/401
7,899,201 B2 * 3/2011 Foletta .......................... 381/353
8,014,555 B2 * 9/2011 Hyde et al. ..................... 381/397
2006/0023903 A1 * 2/2006 Hayashi et al. ............... 381/182
2006/0078144 A1 * 4/2006 Stiles et al. .................. 381/335
2006/0180371 A1 * 8/2006 Breed et al. .................. 180/197
2007/0084286 A1 * 4/2007 Ajay et al. ....................... 73/597
2007/0208390 A1 * 9/2007 Von Arx et al. ................. 607/32

FOREIGN PATENT DOCUMENTS

EP 0 213 319 A2 3/1987
GB 2 196 815 A 5/1988
JP 2004 205346 A 7/2004
JP 2005 323204 A 11/2005
WO WO 2004/082330 A1 9/2004
WO WO 2006/043219 A 4/2006

* cited by examiner

METHOD AND DEVICE FOR DETECTING A DISPLACEMENT AND MOVEMENT OF A SOUND PRODUCING UNIT OF A WOOFER

FIELD OF THE INVENTION

The present invention relates to a method for detecting a position and movement of a sound producing unit of a woofer. The invention also relates to a system comprising a detector for detecting a position and movement of a sound producing unit of a woofer. The invention further relates to a computer program product having a computer program stored therewith, said computer program comprising computer code for detecting a position and movement of a sound producing unit of a woofer.

BACKGROUND OF THE INVENTION

A loudspeaker is an electromechanical transducer that converts electrical signals to sound. Such an electromechanical transducer is also called as a driver or a woofer. The term loudspeaker has also been used of loudspeaker systems which comprise one or more electromechanical transducers, an enclosure (a housing), and optionally additional electronics. In this application the term woofer is mainly used to refer to the electromechanical transducer which comprises inter alia a coil or some other element which converts an electric signal to a mechanical force, and a sound producing unit (usually called as a cone) which is affected by the mechanical force to produce sound on the basis of the electric signal. It should be noted here that the term cone is not restricted to cone-like membranes but also other physical appearances of the sound producing unit can be implemented with the present invention.

The international patent application WO 2004/082330 discloses a woofer equipped with measurement of the movement of the cone of the woofer unit. The measurement is based on detecting a change in a measurement capacitance. The measurement capacitance is formed by adding a cylindrical, conducting plate around the vibrating coil of the woofer. When the coil and the membrane attached with the coil move, the capacitance of the measurement capacitor changes. This change of the capacitance is measured to determine how far the coil and the membrane have moved from the rest position.

The European patent application EP 0 213 319 discloses a woofer having a membrane coupling arrangement to measure the movement of membrane of the woofer. The arrangement comprises a sensor unit and a metal plate. The metal plate is fixed to the membrane of the woofer. The sensor unit is positioned near the membrane of the woofer. Hence, the sensor unit senses the movements of the metal plate when the membrane vibrates along with audio signals.

Both of these system require that the woofer is modified by adding either a conducting plate e.g. a metal plate to the membrane or to the coil of the woofer.

The Chinese patent application publication CN 1173105 discloses a pseudo-zero impedance loudspeaking technique and a sound system. The system uses the feature that the physical quantities relative to the moving speed of vibration membrane in woofer are real-time measured and the physical quantities along with audio signals picked up by sound system can control the movements of vibration membrane. The measurement of the movements of the membrane is based on measuring the changes of the impedance in the woofer driving circuit. The measurement is not based on the real movements of the membrane.

SUMMARY OF THE INVENTION

One aim of the present invention is to provide an improved system for measuring the position of the sound producing unit of the woofer without a need to add any additional parts to the woofer. The invention is based on using acoustic signal measurement. The system comprises an ultrasonic transmitter for producing audio signals which are directed towards the membrane. The sound producing unit reflects the signal and the position of the sound producing unit modulates the phase of the transmitted signal. Therefore, by measuring the phase difference between the transmitted and received signal the position of the cone of the woofer can be measured. Further, by differentiating the displacement with respect to time, the velocity and the acceleration of the cone of the woofer can be measured based on the position data. The first differential will give the velocity, and the second differential will give the acceleration. There are many possibilities to measure the phase differences. For example, by converting an analog signal to a digital signal and performing signal processing on the basis of the digital signal.

According to a first aspect of the present invention there is provided a system comprising

- a loudspeaker system comprising a woofer installed in a housing, said woofer comprising a sound producing unit;
- a transmitter for transmitting an ultrasonic audio signal towards the sound producing unit;
- a receiver for receiving the ultrasonic audio signal reflected by the sound producing unit; and
- a detection unit for determining the position of the sound producing unit on the basis of a phase difference between the ultrasonic audio signal received by the receiver and the ultrasonic audio signal transmitted from the transmitter, said phase difference being dependent on the length of the signal path between the transmitter and the receiver.

The system is primarily characterised in that the system comprises:

- a control unit for adjusting a spring constant effecting to the sound producing unit of the woofer on the basis of the determined position.

According to a second aspect of the present invention there is provided a method for adjusting a response of a loudspeaker system comprising a woofer installed in a housing, said woofer comprising a sound producing unit, the method comprising

- transmitting an ultrasonic audio signal;
- receiving the ultrasonic audio signal;
- determining the position of the sound producing unit on the basis of a phase difference between the received ultrasonic audio signal and the transmitted ultrasonic audio signal, said phase difference being dependent on the length of the signal path between the transmitter and the receiver.

The method of the present invention is primarily characterised in that the method comprises

- adjusting the spring constant effecting to the sound producing unit of the woofer on the basis of the determined position.

According to a third aspect of the present invention there is provided a module to be used in a system comprising

- a loudspeaker system comprising a woofer installed in a housing, said woofer comprising a sound producing unit;
- a transmitter for transmitting an ultrasonic audio signal towards the sound producing unit; and a receiver for receiving the ultrasonic audio signal;

said module comprising a detection unit for determining the position of the sound producing unit on the basis of a phase difference between the received ultrasonic audio signal and the ultrasonic audio signal transmitted from the transmitter, said phase difference being dependent on the length of the signal path between the transmitter and the receiver.

The module is primarily characterised in that the module comprises a control unit for adjusting a spring constant effecting to the sound producing unit of the woofer on the basis of the determined position.

According to a fourth aspect of the present invention there is provided a computer program product comprising computer code for adjusting a response of a loudspeaker system comprising a woofer installed in a housing, said woofer comprising a sound producing unit, the computer program product comprising computer code for transmitting an ultrasonic audio signal;

receiving the modulated ultrasonic audio signal;

determining the position of the sound producing unit of the woofer on the basis of a phase difference between the received ultrasonic audio signal and the transmitted ultrasonic audio signal, said phase difference being dependent on the length of the signal path between the transmitter and the receiver.

The computer program product is primarily characterised in that the computer program product comprises computer code for adjusting a spring constant effecting to the sound producing unit of the woofer on the basis of the determined position.

The present invention has advantages compared to the prior art systems. When utilizing an advantageous embodiment of the present invention there is no need to make any changes to the woofer or add any additional elements to the membrane or to the coil of the woofer. Therefore, the properties of the woofer are not affected by the apparatus measuring the position and movements of the woofer and the woofer cone.

DESCRIPTION OF THE DRAWINGS

In the following the present invention will be described in more detail with reference to the appended drawings in which.

DETAILED DESCRIPTION OF THE INVENTION

Measurement of the Position of the Woofer Cone

Figure 3:
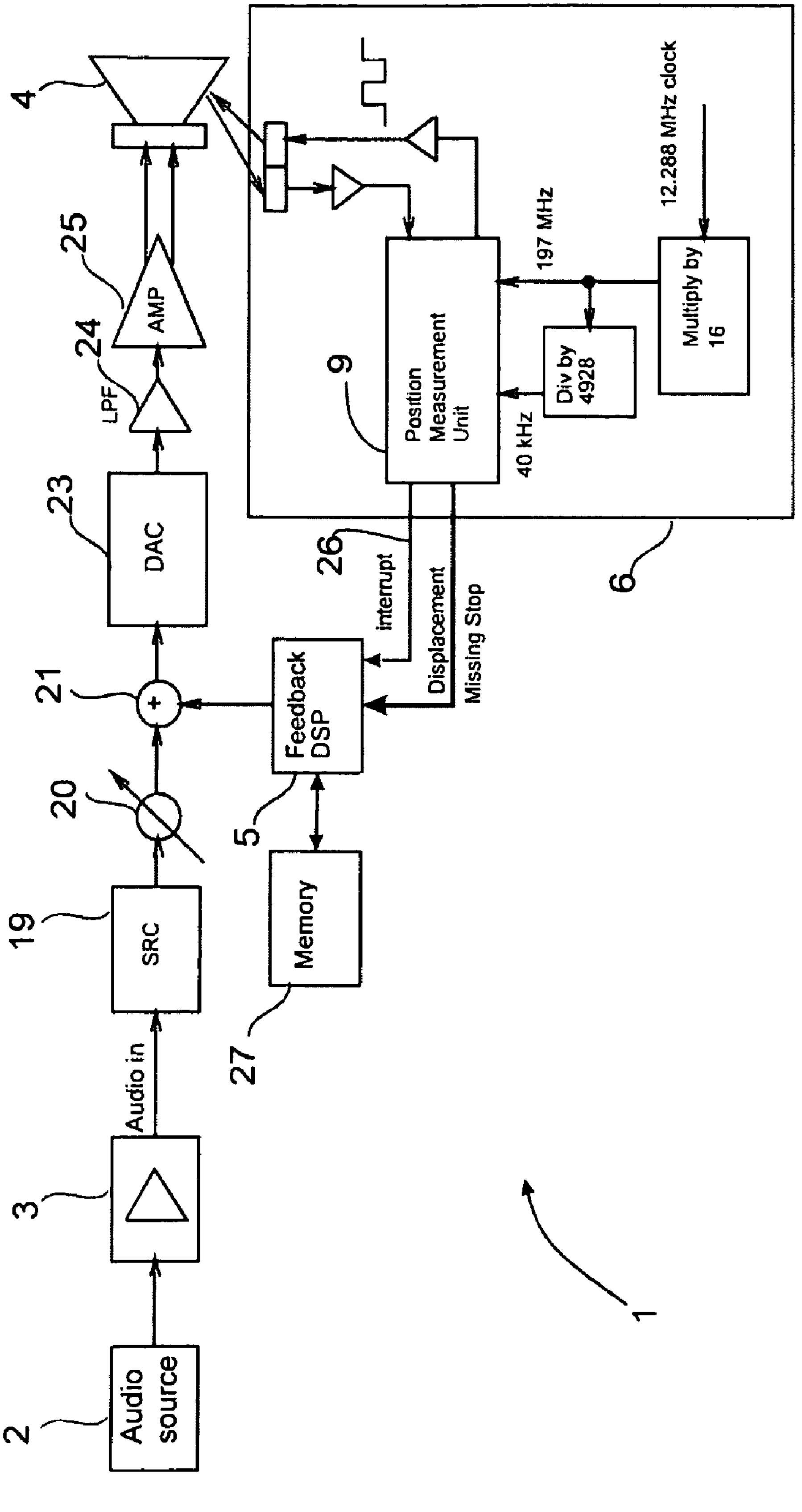
FIG. 3 depicts a system for adjusting the properties of the woofer on the basis of the position of the sound producing unit of the woofer according to an example embodiment of the present invention.

In the following, the invention will be described in more detail with reference to the system of FIG. 3. The system 1 comprises a signal source 2 for generating an audio signal, which will be amplified in an amplifier 3 and led to a loudspeaker comprising one or more woofers 4. It is obvious that, although the following description discloses only one signal generator 2, one amplifier 3 and one loudspeaker, the present invention can also be implemented in stereo and multi-channel audio systems. Hence, there can be more than one signal source 2, or the signal source may generate a stereo and/or a multi-channel signal. Also the amplifier 3 can comprise more than one amplifier blocks. The number of loudspeakers is greater than one in stereo and multi-channel audio systems.

A control unit 5 operates as a measurement and adjustment block for adjusting the operation of the woofer 4 on the basis of measurements performed by a measurement unit 6. The measurement unit 6 is for measuring the position of the sound producing unit 4.2 of the woofer 4 as will be explained below. The sound producing unit 4.2 of the woofer 4 is e.g. a cone but the invention is not limited to woofers having a cone but the invention is also applicable to woofers having other kinds of sound producing units.

The system may also comprise a memory 27 for storing data and computer code, when necessary. The memory 27 can be internal to the control unit 5 or it can be external memory or both internal and external memory. It is also possible that there are several memory units for different blocks of the system, e.g. a memory for the control unit 5 and a memory for the position measurement unit 9.

Figure 4:
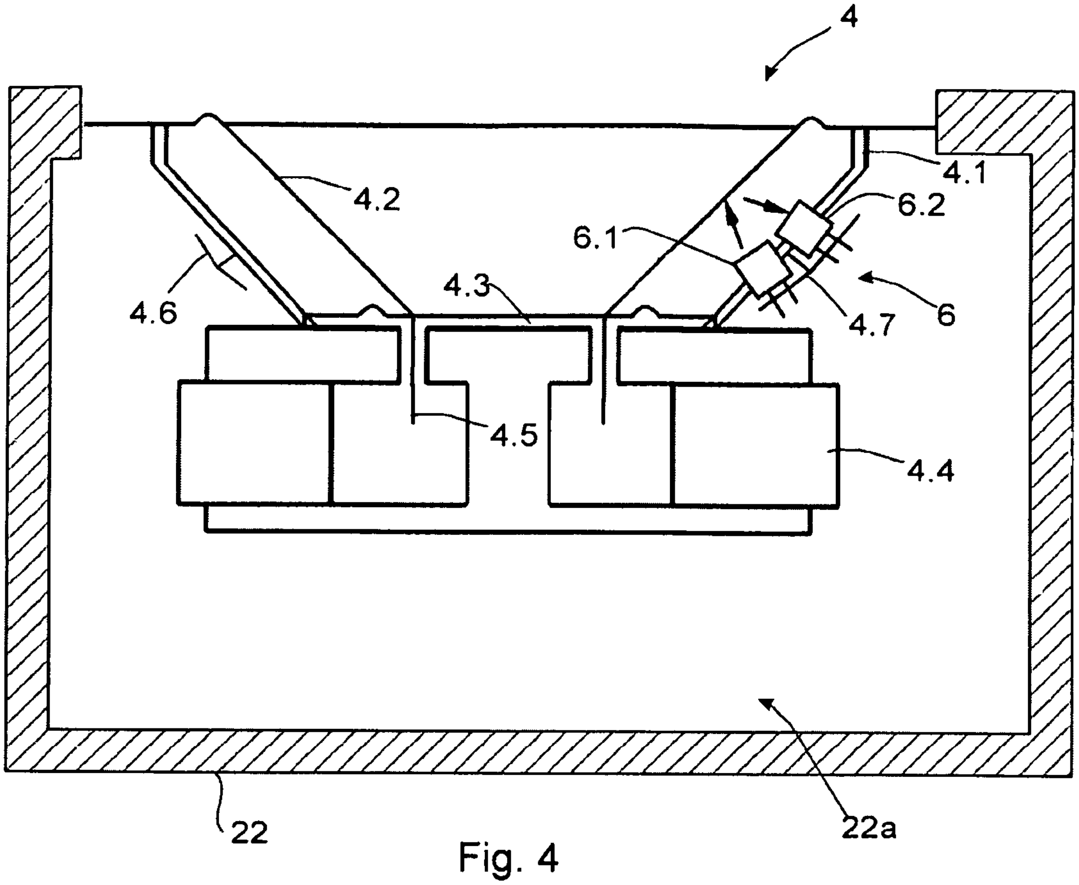
FIG. 4 depicts an example of a woofer comprising an ultrasonic transmitter and receiver according to the present invention.

FIG. 4 depicts a non-limiting example of a woofer 4 to which the measurement unit 6 can be fixed. The woofer 4 comprises a frame 4.1, a cone 4.2, a coil 4.3, a magnet 4.4, a concentrating ring 4.5, a first support element 4.6, and a second support element 4.7. The magnet 4.4 has preferably a circular cross-section so that there is a hole in the middle of the magnet 4.4 into which the coil 4.3 can fit. The coil 4.3 is fixed to the cone 4.2 so that the coil 4.3 can move at least partly in the hole of the magnet 4.4 when a current flows through the coil 4.3. The frame 4.1 of the woofer may also comprise a first support element and a second support element (not shown). The support elements are, for example, overhangs which include through-holes so that fixing elements such as screws or the like can be positioned through the holes. The first support element is usually used to provide a substrate for connectors (not shown) to the coil so that electric signals can be lead to the coil 4.3. The second support element is intended to provide a substrate for connectors of a second coil (not shown) of a woofer, but usually there is only one coil. Hence, the second support element is not used. In this example embodiment of the present invention the second support element is used as a substrate for the measurement unit 6.

The measurement unit 6 comprises an ultrasonic signal transmitter 6.1 to transmit the ultrasonic audio signals. It is obvious that the ultrasonic transmitter 6.1 converts the electrical ultrasonic frequency signal to ultrasonic acoustic sound. The ultrasonic transmitter 6.1 is preferably fixed to the frame of the woofer 4 so that the ultrasonic audio signals transmitted by the ultrasonic transmitter 6.1 are directed towards the woofer cone 4.2. Ultrasonic audio signals are at least partly reflected by the woofer cone 4.2. These reflected ultrasonic audio signals are received by an ultrasonic receiver 6.2 of the measurement unit. An example embodiment of the arrangement of the ultrasonic transmitter 6.1 and the ultrasonic receiver 6.2 is depicted in FIG. 4.

Now, an example embodiment of the method of measuring the position of the cone 4.2 is disclosed in more detail. The ultrasonic transmitter 6.1 produces a constant frequency ultrasonic acoustic signal having a frequency which is preferably at the ultrasonic frequency range, i.e. the signal frequency is higher than the highest frequency a human ear can usually hear. For example, the frequency is in the range of 20 000 to 100 000 Hz, preferably about 40 000 Hz. In other words, the pulse rate is in the range of 20 000 to 100 000 pulses/s, preferably about 40 000 pulses/s. However, the frequency as such is not very important when implementing the present invention.

Figure 1:
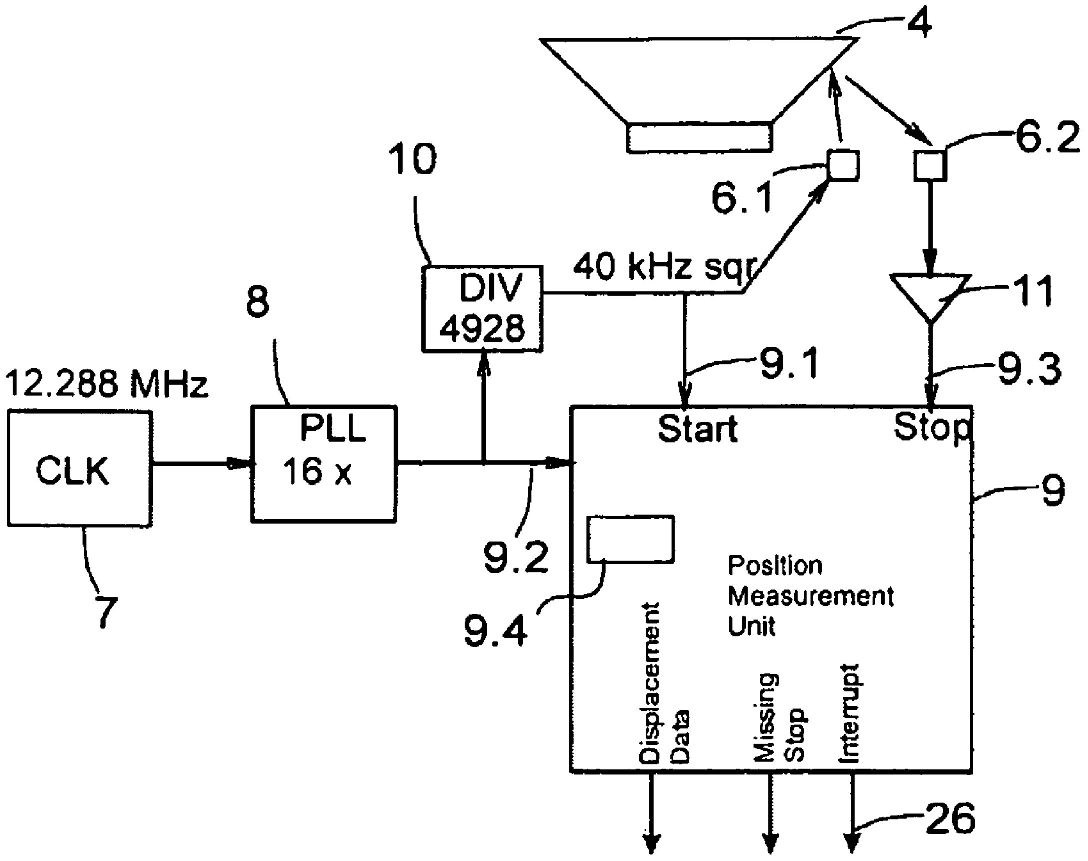
FIG. 1 depicts a system for measuring the position of a membrane of a woofer according to a first example embodiment of the present invention.

The system 1 of FIG. 1 comprises a clock generator 7 which produces a pulsed signal having a certain basic frequency, for example 12.288 MHz. The pulsed signal is connected to a phase locked loop 8, for example. The phase locked loop 8 multiplies the basic frequency by an appropriate factor, which in this example is 16 to produce a multiplied signal having a pulse rate of 197 MHz. This multiplied signal is used as a clock signal to the position measurement unit 9. The multiplied signal is also connected to a divider 10 which divides the frequency of the multiplied signal by a division factor. The division factor is in this example embodiment 4928 to produce a pulsed signal having a frequency of about 40 000 Hz. This signal is connected to the ultrasonic transmitter 6.1 to transmit ultrasonic audio signals having the frequency of about 40 000 Hz. It is obvious that also other methods can be used to produce the different frequencies. For example, separate pulse generators can be used in generation of each of the needed pulsed signals.

The output of the divider 10 is also connected to a start input 9.1 of the position measurement unit 9. The signal in the start input 9.1 controls the position measurement unit to start counting of pulses. For example, a rising edge of the signal at the start input 9.1 affects the position measurement unit 9 to start counting. The position measurement unit 9 counts the pulses of the clock signal at the clock input 9.2 of the position measurement unit 9.

The ultrasonic receiver 6.2 receives the ultrasonic audio signal reflected from the woofer cone 4.2. The received signal is amplified by the receiver amplifier 11 to produce an amplified received signal. In an example embodiment the amplified received signal varies between about 0 V and 3 V but also other voltage levels can be used depending on e.g. the technology with which the position measurement unit 9 is implemented.

The edge which initiates the counting can be called as an activating edge, and the edge which stops the counting can be called as a deactivating edge. The activating edge can be a rising edge or a falling edge or both. Respectively, the deactivating edge can be a rising edge or a falling edge or both. The activating edge need not be the same edge as the deactivating edge.

The amplified received signal is connected to the stop input 9.3 of the position measurement unit 9. The signal in the stop input 9.3 controls the position measurement unit 9 to stop counting of pulses. For example, a rising edge of the signal at the stop input 9.3 affects the position measurement unit 9 to stop counting. Hence, the position measurement unit 9 counts the pulses of the clock signal from the rising edge of the signal at the start input 9.1 to the subsequent rising edge of the amplified received signal.

As was mentioned above, the frequency of the clock signal in this embodiment is about 197 MHz. Therefore, the number of pulses in the clock signal between two consecutive rising edges of the 40 000 Hz signal at the start input 9.1 is about 4928. This means that the signal travels about 8.58 mm during the time between two consecutive rising edges of the 40 000 Hz signal. This is based on the fact that audio signal traverses about 343 m/s and the time between two consecutive edges is 1/40 000 s i.e. about 25 us. The audio signal traverses from the ultrasonic transmitter 6.1 to the cone and further to the ultrasonic receiver 6.2. In this example embodiment the ultrasonic transmitter 6.1 and the ultrasonic receiver 6.2 are fixed near each other. Therefore, the distance between the ultrasonic transmitter 6.1 and the cone 4.2 is approximately the same than the distance between the ultrasonic receiver 6.2 and the cone 4.2. This means that the real distance between the ultrasonic transmitter 6.1 and the cone is approximately half the distance which is calculated on the basis of the measurement results. Therefore, in the first embodiment of the measurement method the detectable range of change in the position of the cone 4.2 is about 4.29 mm, if overflow/underflow detection and 40 000 Hz cycle counting information is not used to extend measurement range over the 40 000 Hz i.e. 25 μs pulse boundaries. In other words, when the cone moves 4.29 mm the phase difference between the transmitted signal and the received signal changes 360 degrees. It should be noted here that the distance between the ultrasonic transmitter 6.1/the ultrasonic receiver 6.2 and the cone 4.2 can be longer than the above mentioned 4.29 mm.

The measurement method according to the first embodiment of the present invention operates as follows. The ultrasonic transmitter 6.1 transmits the ultrasonic signal. At the rising edge of the pulse at time t0 the position measurement unit 9 starts to count the clock pulses. When the cone 4.2 is in the rest position the corresponding part of the reflected signal arrives at the receiver at time t2.

The phase counter 9.4 (FIG. 5) counts up clock cycles by the control of the start 9.1 and stop signals 9.3. The phase counter 9.4 is reset to zero by the start signal 9.1 i.e. when there is a rising edge in the signal to be transmitted by the ultrasonic transducer 6.1 (US-TX). The phase counter 9.4 will be stopped by the stop signal 9.3 i.e. when there is a rising edge in the signal received by the ultrasonic receiver 6.2 (US-RX).

The frequency of the measurement clock i.e. the clock 9.2 to the phase counter 9.4 is in this example embodiment approximately 197 MHz (=12.299 MHz*16). The frequency of the square wave transmitted by the ultrasonic transmitter 6.1 is in this example embodiment the frequency of the measurement clock divided by 4927 i.e. approximately 40 kHz. This means that the maximum counting value of the phase counter 9.4 is 4927 before the next reset will occur. The maximum value will only be achieved when the stop signal 9.3 is not activated between two consecutive start signals 9.1.

The value of the phase counter 9.4 will be loaded to a first register 9.5 always when the start signal 9.1 is activated. Hence, the value of the register 9.5 corresponds with the phase difference between the transmitted ultrasonic signal and the received ultrasonic signal, which is dependent on the distance between the ultrasonic transmitter 6.1 and the cone 4.2 of the woofer and the distance between the ultrasonic receiver 6.2 and the cone 4.2 of the woofer. In other words, i.e. the phase difference is dependent on the length of the signal path of the ultrasonic signal.

By the above disclosed arrangement one measurement sample is obtained for each ultrasonic pulse. In the example embodiment this means that measurement samples are obtained at a frequency of about 40 kHz.

The accuracy of the measurement is determined by the ratio between the frequency of the measurement clock and the frequency of the ultrasonic signal. The greater is the frequency of the measurement clock compared to the frequency of the ultrasonic signal the more accurately the phase difference and, therefore, the position of the cone 4.2 of the woofer can be measured. In the example embodiment the characteristic frequency of the ultrasonic transmitter and the ultrasonic receiver is about 40 kHz to which the frequency of the square wave to be transmitted by the ultrasonic transducer should be adapted.

Overflow/Underflow

The overflow occurs when the phase difference between the transmitted ultrasonic signal and the received ultrasonic signal is greater than one whole phase (360 degrees). In the example embodiment the phase difference between the transmitted ultrasonic signal and the received ultrasonic signal increases to one whole phase when the movement of the cone 4.2 of the woofer is about 4.29 mm (the crossover point). Several crossovers may occur depending on the range of movement of the cone 4.2 of the woofer. For example, if the maximum amplitude of the movement of the cone 4.2 of the woofer is appr. 20 mm (i.e. the range of the movement of the cone 4.2 of the woofer is appr. 40 mm), three overflows can occur (=20 mm/4.29 mm−1). This means that there exist six crossover points in the range of movement of the cone 4.2 of the woofer. Respectively, in an underflow situation the phase difference shifts to a previous whole phase.

The overflow and the underflow can be detected on the basis of a rapid change between two successive counter values. If a new value of the phase counter 9.4 is much smaller than the previous value of the phase counter 9.4, it is indicative of an overflow situation. Hence, the value of the phase counter 9.4 has to be increased by the value which corresponds with one whole phase. In the example embodiment the offset value O to be added to the counter value is 4298. Respectively, if a new value of the phase counter 9.4 is much larger than the previous value of the phase counter 9.4, it is indicative of an underflow situation. Hence, the value of the phase counter 9.4 has to be decreased by the offset value O which corresponds with one whole phase i.e. in the example embodiment the offset value 4298 have to be subtracted from the value of the phase counter 9.4.

As it was mentioned above, depending on the range of movement of the cone 4.2 of the woofer there can exist a plurality of overflows/underflows. Hence, a multiple of the offset value have to be added to/subtracted from the counter value. In the example embodiment of FIG. 5 there is a cycle counter 9.9 which keeps track on the number of overflows and underflows which may have occurred. When an overflow has been detected the cycle counter 9.9 is increased by one (N=N+1) and when an underflow has been detected the cycle counter 9.9 is decreased by one (N=N−1). The offset value O is stored in the device, for example in an offset register 9.14. Hence, the corrected phase counter value is determined by the multiplier M1 and the adder Sum1 as follows: corrected phase counter value (i.e. the measurement value)=phase counter value+N*O.

The value of the first register 9.5 will be loaded to the second register 9.6 at the activation of the start signal. Hence, the second register 9.6 contains the previous measurement value to be used in the detection of a possible overflow or underflow situation. In an initial state and when the cone 4.2 of the woofer is in a rest position the cycle count value N is zero. In the above mentioned example in which the maximum amplitude of movement of the cone 4.2 of the woofer is 20 mm, the cycle count value is 3 when the cone 4.2 of the woofer is at one end of the range of movement (+20 mm from the rest position) and the cycle count value is −3 when the cone 4.2 of the woofer is in the opposite end of the range of movement (−20 mm from the rest position).

In an overflow situation the edge of the pulse of the received ultrasonic signal moves to the next phase, wherein the stop signal 9.3 will not be activated between two consecutive rising edges of the transmitted signal. This means that the value of the phase counter is the value corresponding to one whole phase which in the example embodiment is 4298. This value will be loaded to the first register 9.5 at the rising edge of the start signal 9.1 which also resets and starts the phase counter 9.4. The next rising edge in the received ultrasonic signal will stop the phase counter 9.4 relatively soon after the phase counter 9.4 has started counting. Hence, the value of the phase counter 9.4 is much smaller than the previous value stored to the first register 9.5. This information can be used to detect the overflow situation for example as using the arrangement of FIG. 5. For example, the overflow/underflow detection can be performed by subtracting in the third adder Sum3 the phase counter value stored in the first register 9.5 from the phase counter value stored in the second register 9.6. The third adder Sum3 outputs the result to the overflow/underflow detection element 9.12 which examines the result. In an overflow situation the overflow/underflow detection element 9.12 outputs a signal which increases the cycle counter value N by one and, respectively, in an underflow situation the overflow/underflow detection element 9.12 outputs a signal which decreases the cycle counter value N by one.

The decision to increment or decrement the cycle counter value N by one may be based on e.g. how large is the difference between two successive counter values. For example, if the difference between the previous value of the phase counter 9.4 and the new value of the phase counter 9.4 is greater than half of the offset value (>½*4928 in this example embodiment), the cycle counter value N is decremented by one. Respectively, if the difference between the previous value of the phase counter 9.4 and the new value of the phase counter 9.4 is smaller than half of the negation of offset value (<½*4928 in this example embodiment), the cycle counter value N is incremented by one.

Figure 5:
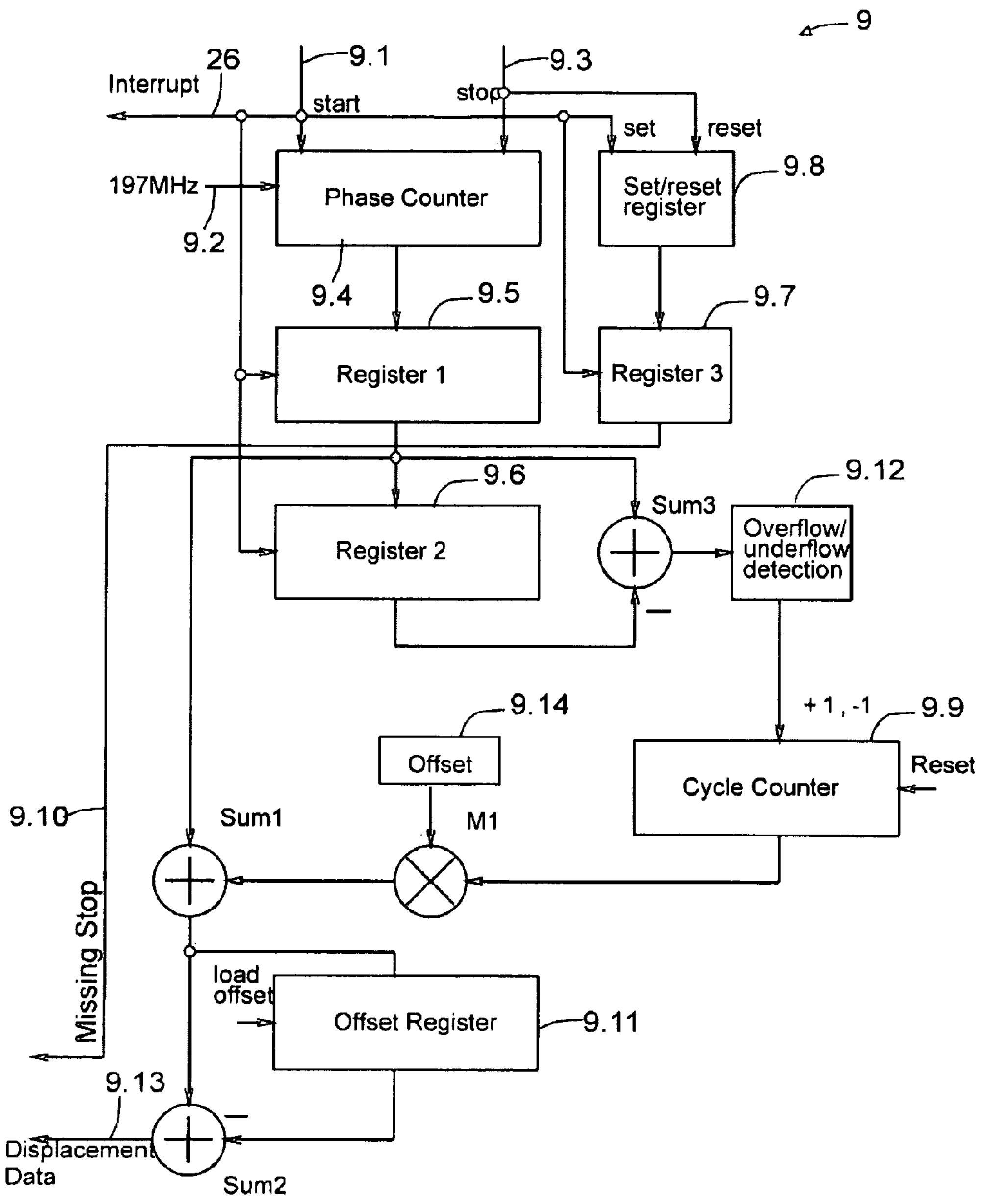
FIG. 5 illustrates an example embodiment of a position measurement unit.

In FIG. 5 the start signal 9.1 sets the set/reset register 9.8 and the stop signal 9.3 resets the set/reset register 9.8. The contents of the set/reset register 9.8 will be loaded to the third register 9.7 at the rising edge of the start signal 9.1. Now, if there are two consecutive rising edges in the start signal 9.1 without a rising edge in the stop signal 9.3, the first rising edge of the start signal 9.1 loads the current value of the set/reset register 9.8 to the third register 9.7 and sets the set/reset register 9.8 e.g. to a logical value 1. It can be assumed that the set/reset register 9.8 has previously been reset (e.g. has a logical 0 value) so the value which is loaded to the third register 9.7 corresponds with the reset value. Then, the next rising edge of the start signal 9.1 will load the current value of the set/reset register 9.8 (i.e. the set value, logical 1) to the third register 9.7. The value of the third register 9.7 will be used as a missing stop signal 9.10 which indicates that there have been two consecutive rising edges in the start signal without a rising edge in the stop signal 9.3 (i.e. the stop signal have been "missing"). In other words, in this example embodiment when the value of the third register 9.7 is set it indicates the missing stop. The next rising edge of the stop signal 9.3 will reset the set/reset register 9.8.

The missing stop signal 9.10 can be used as an indication of an exceptional situation (overflow/underflow).

If the rising edges in the start 9.1 and stop signals 9.3 appear after each other (i.e. no missing stop signals 9.10), the third register 9.7 will always be in a reset state because the set/reset register 9.8 is in a reset state at the rising edge of the start signal 9.1.

The Rest Position of the Cone of the Woofer

When the cone 4.2 of the woofer is in a rest position the phase difference between the transmitted ultrasonic signal and the received ultrasonic signal can have any value, depending on the mutual positions of the ultrasonic transmitter 6.1 and the ultrasonic receiver 6.2. In practise, the phase difference can be different in different devices. If it is desired that a position measurement value will be zero when the cone 4.2 of the woofer is in the rest position, the measured value can be corrected by adding or subtracting a certain rest position offset value from a measurement result. The rest position offset value is the value corresponding to the measured phase difference when the cone 4.2 of the woofer is in the rest position. For example in the embodiment of FIG. 5 the rest position offset register 9.11 can be used to store the offset value and the second adder Sum2 subtracts the rest position offset value from the measured value calculated by the multiplier M1 and the first adder Sum1. The measured value is the phase counter value stored in the first register 9.5 corrected by a possible overflow/underflow correction.

The corrected measured value contains the displacement data 9.13 i.e. indicates the displacement of the cone 4.2 of the woofer from the rest position.

Figure 6A:
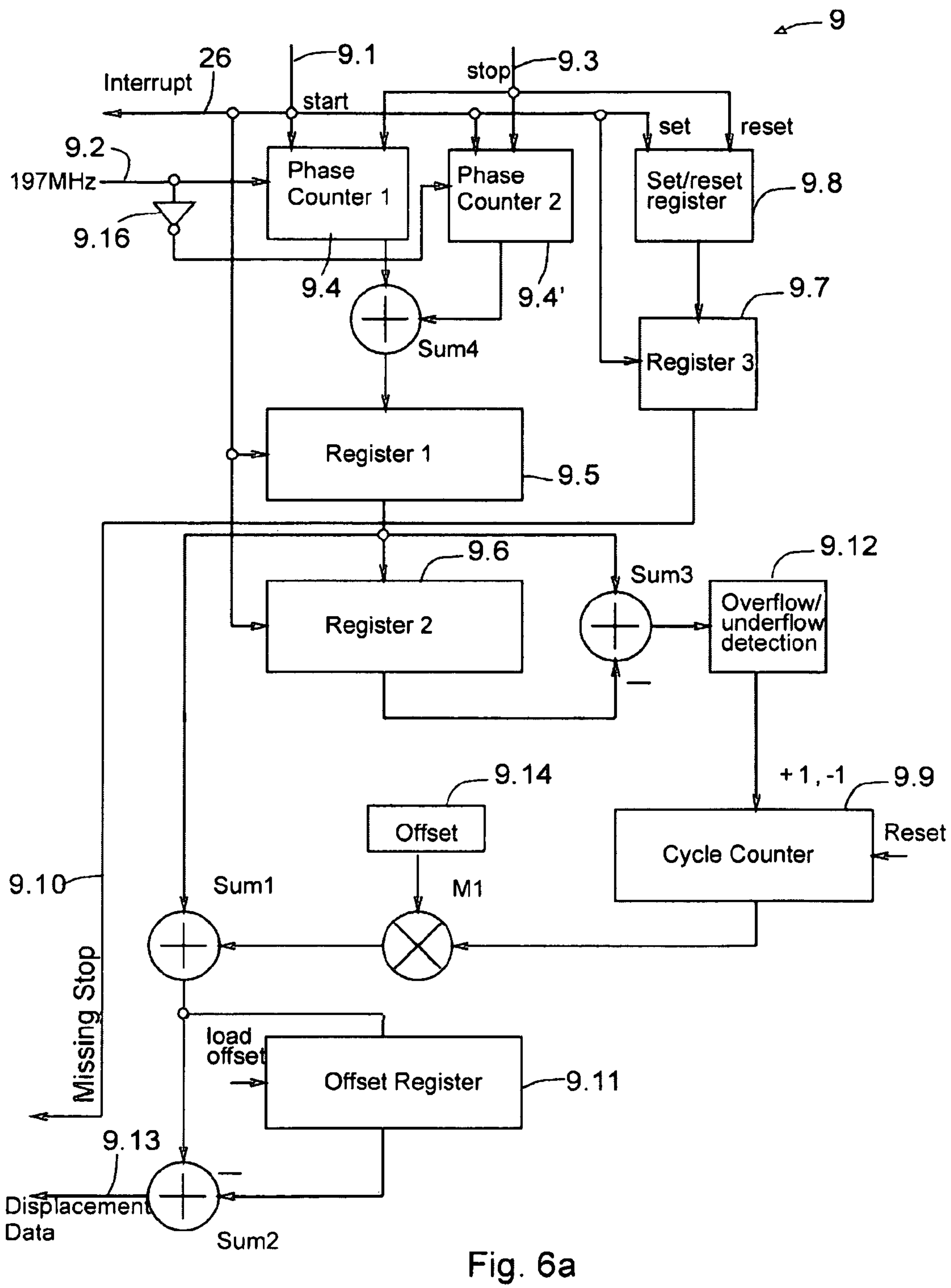
FIG. 6*a* illustrates another example embodiment of the position measurement unit.
Figure 6B:
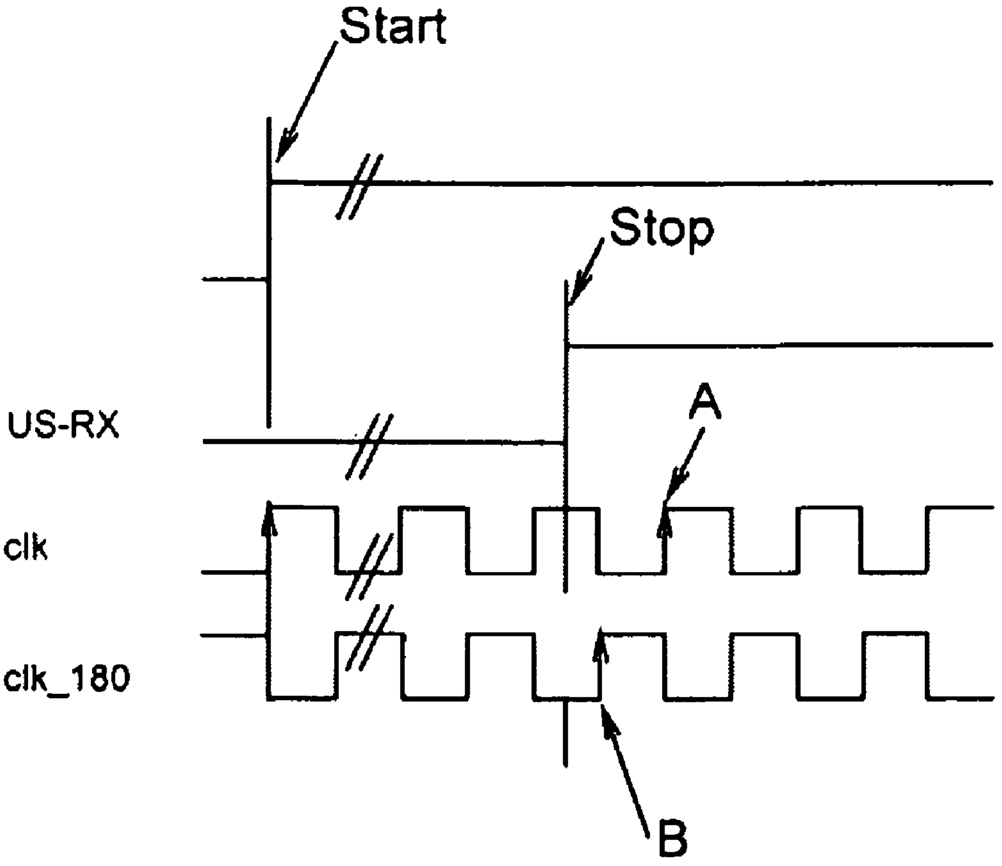
FIGS. 6*b* and 6*c* illustrate the use of both the rising and the falling edge of a clock signal to double the measurement precision.
Figure 6C:
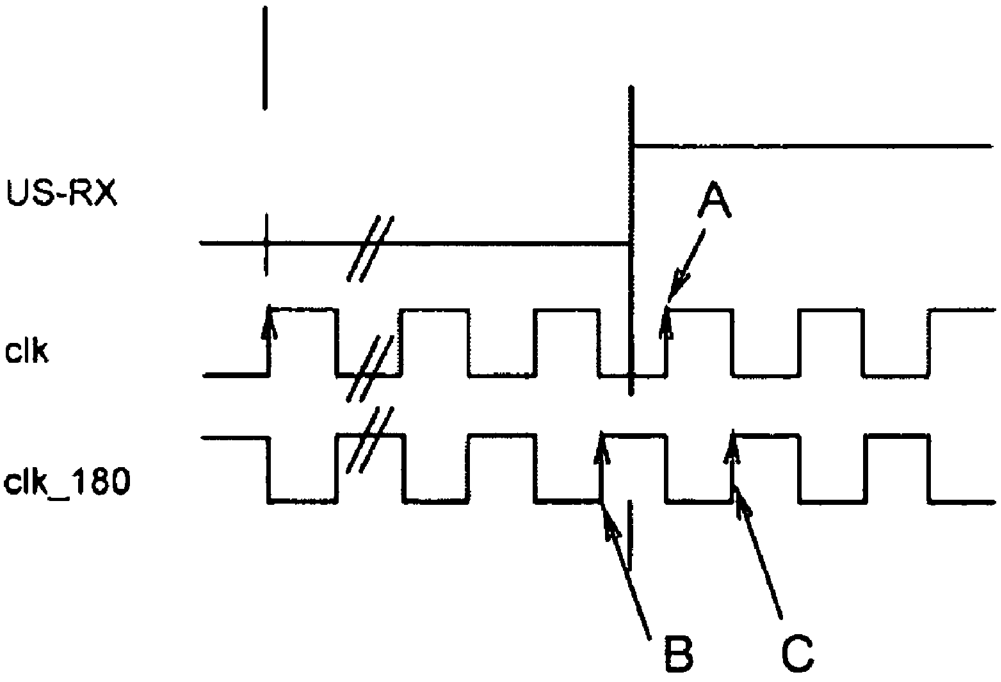

There can also be more than one phase counters 9.4 in the phase measurement units 9 to increase the accuracy of the measurement. For example when two phase counters 9.4, 9.4' are used (FIG. 6*a*) one of the phase counters 9.4 counts at the rising edges of the clock signal 9.2 and the other phase counters 9.4' counts at the falling edges of the clock signal 9.2. This arrangement doubles the accuracy of the measurement because the position of the cone 4.2 of the woofer can be determined at an accuracy of a half clock cycle. The counting values of the first and the second phase counters 9.4, 9.4' will be summed e.g. in the third adder sum3 after which the sum will be stored to the first register 9.5. The operation of this embodiment is illustrated in FIGS. 6*a* and 6*b*. The line marked with clk illustrates the clock signal to the first phase measurement unit 9 and the line marked with clk_180 illustrates the clock signal to the second phase measurement unit 18 which has a phase difference of 180 degrees with respect to the clock signal clk. The phase difference can be formed e.g. by the inverter 9.16. The phase measurement units 9, 18 stop counting at the rising edge of the received signal US-RX. In the situation of FIG. 6*b* the value of the first phase counter 9.4 is shifted to the output of the first phase counter 9.4 at the subsequent rising edge of the clock signal clk (marked with an arrow A in FIG. 6*b*) and, respectively, the value of the second phase counter 9.4' is shifted to the output of the second phase counter 9.4' at the subsequent rising edge of the clock signal clk_180 (marked with an arrow B in FIG. 6*b*). The values at the outputs of the first 9.4 and the second phase counter 9.4' are summed by the adder Sum4 and store to the first register 9.5. In the situation of FIG. 6*c* the counting is stopped at a different phase of the clock signal. In this example situation the stop signal occurs after a rising edge of the phase shifted clock signal clk_180 but before the subsequent rising edge of the clock signal clk. Therefore, the second phase counter 9.44' has counted one edge more than the first phase counter 9.4 (i.e. the second phase counter 9.44' has counted the edge marked with the letter B in FIG. 6*c*. The counter value of the second phase counter 9.44' is shifted to the output of the second phase counter 9.44' at the subsequent rising edge of the clock signal clk_180 (marked with an arrow C in FIG. 6*c*).

Figure 2:
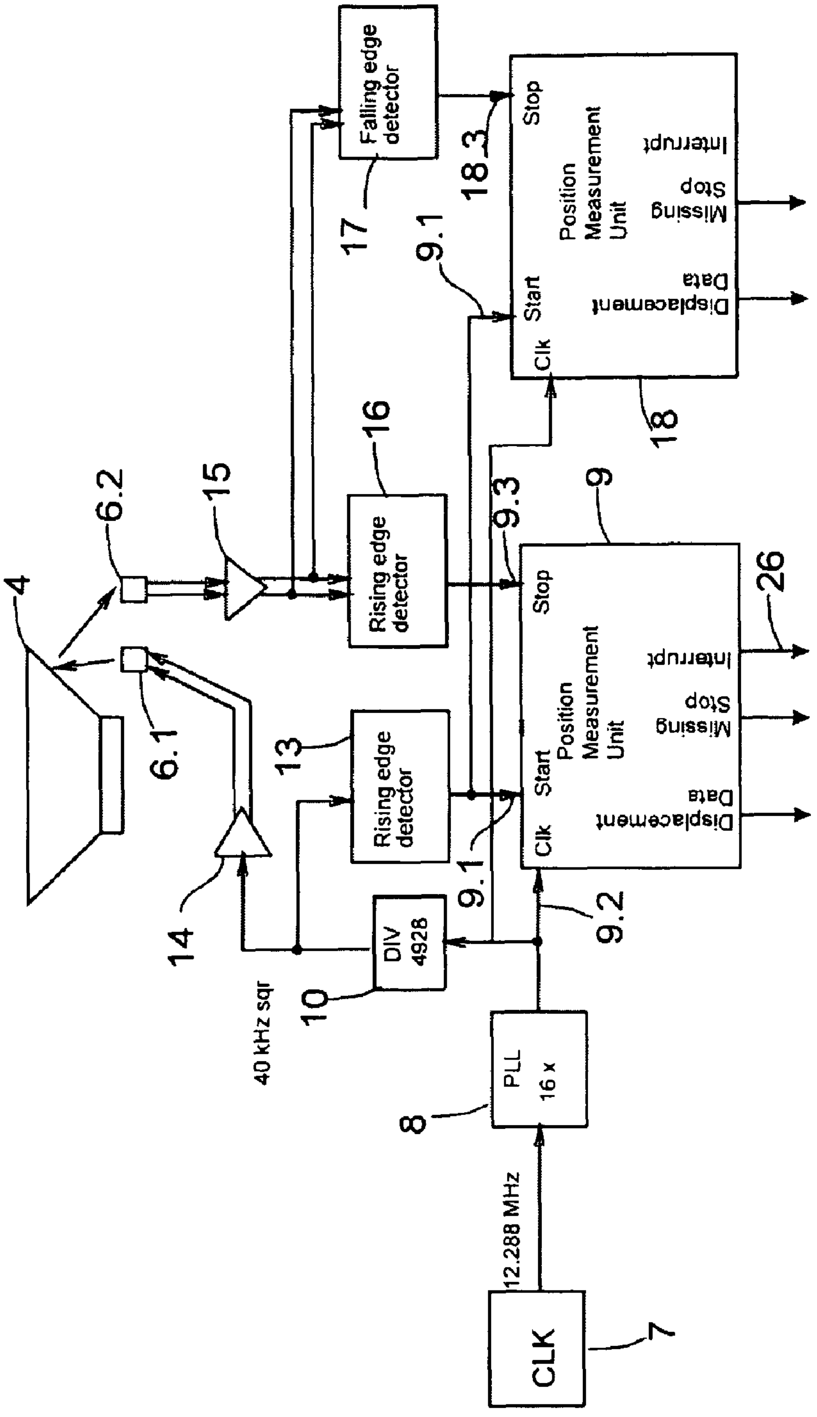
FIG. 2 depicts a system for measuring the position of a membrane of a woofer according to a second example embodiment of the present invention.

There can also be more than one phase measurement unit to increase the accuracy of the measurement. For example when two phase measurement units 9, 18 are used (FIG. 2) the first phase measurement units 9, 18 starts counting of the clock pulses at the rising edge of the signal to be transmitted starts and stops counting of the clock pulses at the rising edge of the received signal whereas the second phase measurement units 18 starts counting of the clock pulses at the rising edge of the signal to be transmitted starts and stops counting of the clock pulses at the falling edge of the received signal. The measurement result is e.g. the average value of the measurement results of the first 9 and the second phase measurement unit 18.

Adjusting the Woofer

When the position of the woofer cone 4.2 is measured the position data can be used in adjusting the properties of the woofer. The position data enables to adjust the parameters of the movement equation of a simple harmonic motion (SHM). When the woofer 4 is assembled in a housing 22 (FIG. 4) the interior 22*a* of the housing causes an acoustic spring effect to the woofer because the movement of the woofer cone 4.2 causes pressure changes in the air inside the housing 22. In other words, the air is compressed by the movement of the woofer. The compressed air stores energy which will resist the movement of the cone and the air acts like a spring. This kind of spring effect will become very stiff in a small housing. The stiffness of the spring effect affects a stronger resonance moving towards higher frequencies compared to the situation in which the woofer is in a free air or in a larger housing.

Figure 7:
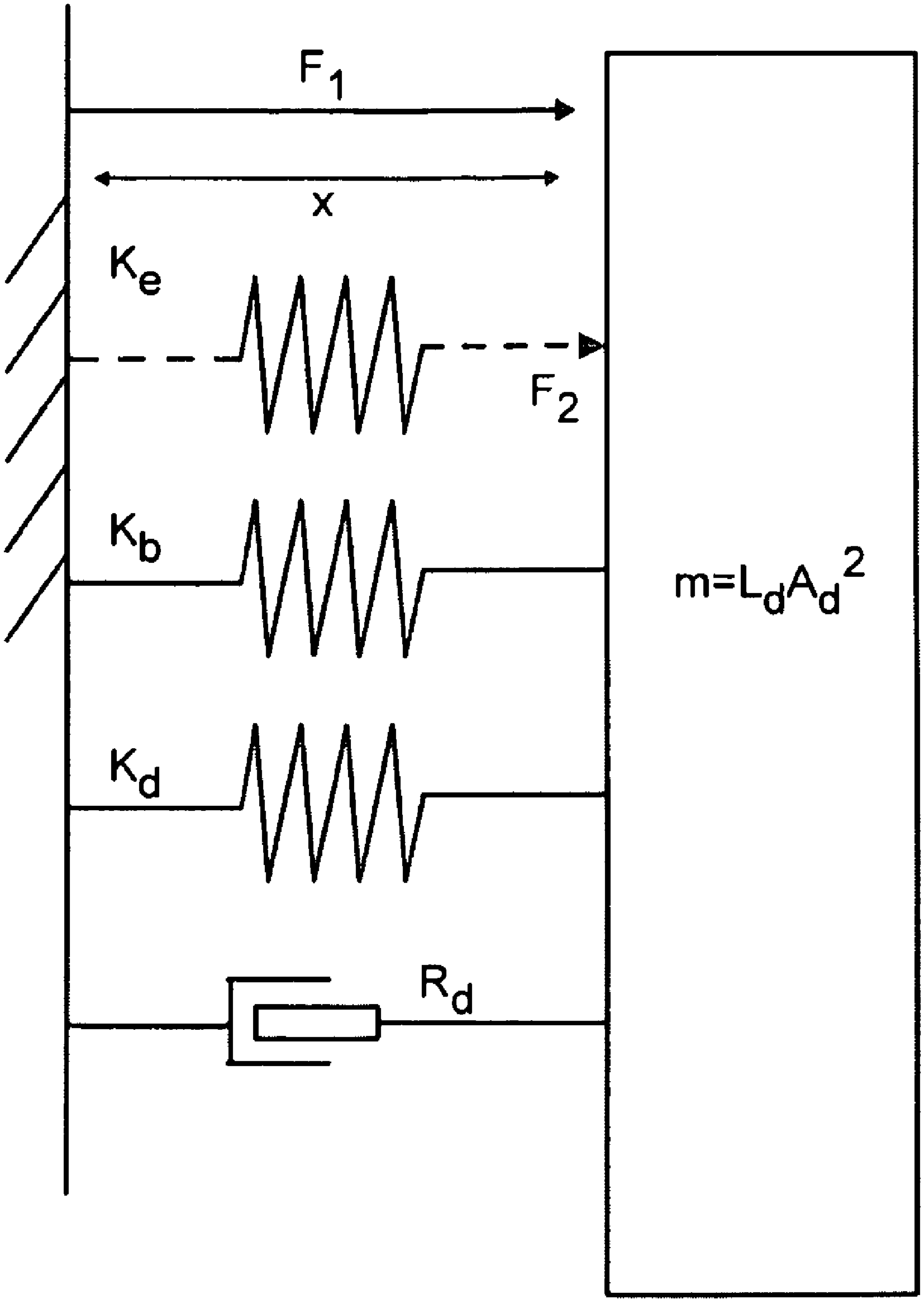
FIG. 7 illustrates the simple harmonic motion model.

The characteristic frequency of a woofer can be derived from differential equations. The characteristic frequency of a woofer for an under-critically damped system is of the form $$f' = \frac{1}{2\pi}\sqrt{\frac{k_{tot}}{m} - \frac{R_d^2}{4m^2}} \tag{1}$$

in which f=the characteristic frequency of the system (the natural resonance frequency, $k_{tot}$=the spring constant of the total spring system, m=the moving (average) mass, $R_d$=the mechanical viscous total loss, The simple harmonic motion model is illustrated in FIG. 7.

The characteristic frequency is the frequency in which the system will oscillate when continuous stimulus is not present. The spring constant can be calculated by adding spring constants of all springs connected in parallel. The spring constants of two springs connected in series can be obtained by the formula $$K_{tot\_serial} = \frac{K_1 K_2}{K_1 + K_2} \tag{2a}$$

The spring constants of N springs connected in series can be obtained by the formula $$1/K_{tot\_serial} = \sum_{i=1}^{N} 1/K_i \tag{2b}$$

The moving average mass is the mass of a solid object in a vacuum added with the mass of air stuck with the object and weighed impulse. The mechanical viscous total loss means the loss of energy which is directly proportional to the velocity in the direction of movement of the vibration.

The resonance is unfavourable for the quality of sound wherein there is usually a certain lower limit to the size of the housing 22 of the woofer. The parameters typically change due to aging and use of the woofer. Therefore, controlling the resonance without a feedback can be inaccurate.

A definition for a spring can be expressed as follows: A force being dependant to the displacement. The spring constant can be defined by:

$$K=-F/x, \text{in which} \tag{3}$$

K=spring constant,
F=force,
x=displacement from the rest position of the spring.

The force is always opposite to the direction of the displacement. In other words, the force tries to return the spring to the rest position. The energy $E_k$ stored by the spring is $$E_k = \frac{1}{2}Kx^2 \tag{4}$$

Further, some energy is also stored in the mass m of the woofer. This energy $E_m$ is $$E_m = \frac{1}{2}mv^2 \tag{5}$$

The characteristic frequency of the harmonic oscillator system is strongly affected by the spring constant of the total spring system. When the position of the woofer is known, a negative spring constant $K_\theta=-K$ can be calculated to compensate the spring force caused by the displacement. However, there are also other springs connected in parallel in the system comprising the woofer 4 and the housing 22. The total spring constant of the system is as follows.

$$K_{tot}=K_d+K_b+K_e \tag{6}$$

in which
$K_d$=the spring of the woofer cone 4.2, and
$K_b$=the acoustic spring of the housing 22, The spring of the woofer is caused by the fastenings of the cone 4.2 to the frame 4.1 of the woofer and by the concentrating ring 4.5 of the cone. This spring is not linearly time dependent system (LTI) but it is strongly unlinear in large amplitudes (large displacements) and also depends on aging.

The acoustic spring $K_b$ of the housing 22 is approximately constant but is somewhat dependent on temperature.

As a part of the springs connected in parallel, the total spring constant can be adjusted by using the electrical spring constant $K_e$ of Equation (6). Therefore, the characteristic frequency of Equation (1) becomes controllable. However, to maintain the characteristic frequency in a real value range i.e. to maintain a stable oscillation the total spring constant $K_{tot}$ should remain positive. In FIG. 7 the compensating string force caused by the electrical string is marked with $F_2$. The force F1 is the electromechanical force caused by the current generated by the amplifier to the woofer coil 4.3.

The generation of the compensating force $F_2$ is dependent on the measured position of the cone 4.2. The force to be generated may be dependent on the woofer in question. Therefore, a compensation table or a compensation curve should be generated for different types of woofers. This may be obtained by measuring the properties of the woofer (e.g. the frequency response) without compensation and forming a compensation table on the basis of the measurement.

Now, the adjustment on the basis of the position of the cone 4.2 will be shortly described with reference to the system of FIG. 3. It is assumed that the signal which is input to the apparatus of FIG. 3 is in digital form but it is obvious that the signal can also be processed in analog form without conversing the signal to digital and back to analog. Samples of the digital audio signal are converted to a different sample rate, if necessary, by a sample rate converter 19. The volume controller 20 adjusts the volume wherein the adjusted signal is provided to the adder 21. The adder gets another input from the control unit 5 such as a digital signal processor (DSP). The control unit 5 may perform offset removal, gain adjustment, and limit the range of the position values, if necessary. The control unit 5 may also comprise a DC blocking filter in order to filter out the effect of minor pressure leakage out of the housing 22. The output of the adder 21 is input to the digital-to-analog converter 23. The digital-to-analog converter 23 forms the analog signal on the basis of the digital input. The analog signal is low-pass filtered in a low-pass filter 24 and amplified by an amplifier 25. The amplifier can also operate as a voltage-to-current converter to produce a current dependent on the input voltage. The current is connected to the coil 4.3 of the woofer 4.

When the adjustment circuit is in operation the measurement system 1 measures the position of the cone 4.2. The position measurement unit 9 generates an interrupt signal 26 and outputs the position data (counter value) to the control unit 5 which calculates the correct strength for the compensation force $F_2$ and, using the equations described above, forms a corresponding feedback voltage to be summed with the audio signal in the adder 21.

When the position of the woofer cone 4.2 has been measured the operation of the woofer 4 can be linearized e.g. by software so that the operation of the woofer is practically linear or almost linear even with high sound pressures i.e. when the woofer cone 4.2 has large range of movement. Therefore, the parameters such as the BI parameter (the Transduction Constant), compliance and other unlinear properties which depend on the position, the velocity and/or the acceleration, can be corrected at low frequencies of the input audio signal.

Although it was mentioned above that mainly rising edges are used in the control of the counting of pulses, it is obvious that also falling edges can be used instead, or in addition to. This may require some minor changes to the details of the system. For example, the rising edge detectors may need to be replaced with falling edge detectors.

In yet another embodiment of the present system either the ultrasonic transmitter 6.1 or the ultrasonic receiver 6.2 can be fixed to the woofer cone 4.2. Hence, the signal traverses directly from the ultrasonic transmitter 6.1 to the ultrasonic receiver 6.2 without reflecting from the woofer cone 4.2. Therefore, the length of the signal path is the distance between the ultrasonic transmitter 6.1 and the ultrasonic receiver 6.2.

The present invention can be implemented by using hardware components for the operations and/or as a computer code which can be run by a processor or by a number of processors. Such processors can include, for example, one or more digital signal processors, microprocessors etc. The computer code can be stored to a storage medium so that the computer code can be run by a processor from the storage medium, and/or the computer code may be downloaded from the storage medium to the memory 27, for example. The computer code stored to a storage medium can also be called as a computer program product.

The invention claimed is:

1. A system, comprising:

a loudspeaker system comprising a woofer installed in a housing, said woofer comprising a sound producing unit;

an ultrasonic audio transmitter for transmitting an ultrasonic audio signal;

an ultrasonic audio receiver for receiving the ultrasonic audio signal;

a position detection unit for determining the position of the sound producing unit based on a phase difference between the ultrasonic audio signal received by the receiver and the ultrasonic audio signal transmitted from the transmitter, said phase difference being dependent on a length of a signal path between the transmitter and the receiver;

a control unit for adjusting a spring constant effecting to the sound producing unit of the woofer on the basis of the determined position.

2. The system according to claim 1, wherein the transmitter is configured to transmit the ultrasonic signal towards the sound producing unit, wherein the receiver is configured to receive an ultrasonic signal reflected by the sound producing unit.

3. The system according to claim 1, wherein the transmitter is configured for transmitting the ultrasonic audio signal towards the sound producing unit, wherein the receiver is configured for receiving the ultrasonic audio signal reflected by the sound producing unit.

4. The system according to claim 1, further comprising:

a clock generator for generating a clock signal;

a divider for dividing the clock signal to a smaller frequency, wherein the transmitter is configured for forming a pulsed signal on the basis of the divided clock signal to be used as said the ultrasonic audio signal;

a detector for detecting pulses of the ultrasonic signal received by the ultrasonic receiver; and a counter for counting time between an activating edge of the signal to be transmitted and an deactivating edge of the received signal.

5. The system according to claim 4, wherein the counter comprises:

a start input for starting the counting of time at said activating edge of the signal to be transmitted;

a stop input for stopping the counting of time at said deactivating edge of the received signal.

6. The system according to claim 4, wherein said deactivating edge of the received signal is the subsequent edge after the activating edge of the signal to be transmitted which stated the counting of time.

7. The system according to claim 1, further comprising:

a phase overlap control unit for determining an overflow/underflow situation, in which overflow situation two activating edges of the signal to be transmitted occur between two deactivating edges of the received signal, and in which underflow situation two deactivating edges of the received signal occur between two activating edges of the signal to be transmitted.

8. The system according to claim 1, wherein the control unit is configured to calculate a negative spring constant for the loudspeaker system, said negative spring constant being based on the determined position of the sound producing unit, and to form an adjustment signal on the basis of the calculated negative spring constant to be added to an audio signal.

9. The system according to claim 8, wherein the system is configured to calculate said negative spring constant on the basis of the equation $$K_{tot}=K_d+K_b+K_e$$

in which $K_d$=the spring of the woofer cone, $K_b$=the acoustic spring of the housing, and $K_{tot}$=the total spring constant, wherein the control unit is configured to set the negative spring constant ($K_e$) to a value by which the total spring constant ($K_{tot}$) remains positive.

10. The system according to claim 1, wherein either the receiver or the transmitter is installed to the sound producing unit, wherein the receiver is configured for receiving the ultrasonic audio signal directly from the ultrasonic transmitter.

11. A method for adjusting a response of a loudspeaker system comprising a woofer installed in a housing, said woofer comprising a sound producing unit, the method comprising:

transmitting an ultrasonic audio signal with an ultrasonic audio transmitter;

receiving the ultrasonic audio signal with an ultrasonic audio receiver;

determining with a position detection unit the position of the sound producing unit based on a phase difference between the received ultrasonic audio signal and the transmitted ultrasonic audio signal, said phase difference being dependent on a length of a signal path between the transmitter and the receiver; and adjusting a spring constant effecting to the sound producing unit of the woofer on the basis of the determined position.

12. The method according to claim 11, further comprising:

transmitting the ultrasonic audio signal towards the sound producing unit; and receiving the ultrasonic audio signal reflected by the sound producing unit.

13. The method according to claim 11, further comprising:

generating a clock signal;

dividing the clock signal to a smaller frequency;

forming a pulsed signal on the basis of the divided clock signal to be used as said the ultrasonic audio signal;

detecting pulses of the ultrasonic signal received by the ultrasonic receiver; and counting time between an activating edge of the signal to be transmitted and an deactivating edge of the received signal.

14. The method according to claim 13, comprising:

starting the counting of time at said activating edge of the signal to be transmitted;

stopping the counting of time at said deactivating edge of the received signal.

15. The method according to claim 13, wherein said deactivating edge of the received signal is the subsequent edge after the activating edge of the signal to be transmitted which stated the counting of time.

16. The method according to claim 11, further comprising:

determining an overflow or an underflow situation by forming a first pulse count value by measuring time between an activating edge of the signal to be transmitted and an deactivating edge of the received signal, forming a second pulse count value by measuring time between another activating edge of the signal to be transmitted and another deactivating edge of the received signal, comparing the difference between the first pulse count value and the second pulse count value with a reference value, wherein the overflow situation is determined if the comparison indicates that the difference is greater than the reference value, and the underflow situation is determined if the comparison indicates that the difference is smaller than the negation of the reference value.

17. The method according to claim 11, further comprising:

calculating a negative spring constant for the woofer, said negative spring constant being based on the determined position of the sound producing unit; and forming an adjustment signal on the basis of the calculated negative spring constant to be added to an audio signal.

18. The method according to claim 17, further comprising:

calculating said negative spring constant on the basis of the equation $$K_m = K_d + K_b + K_e$$

in which $K_d$=the spring of the sound producing unit, $K_b$=the acoustic spring of the housing, and $K_{tot}$=the total spring constant, wherein the method further comprises setting the negative spring constant to a value by which the total spring constant remains positive.

19. The method according to claim 11, further comprising:

using a rising edge of the signal to be transmitted as said starting the counting of time at said activating edge; and using a rising edge of the received signal as said deactivating edge.

20. The method according to claim 11, further comprising:

using a rising edge of the signal to be transmitted as said starting the counting of time at said activating edge; and using both a rising edge and a falling edge of the received signal as said deactivating edge.

21. The method according to claim 11, further comprising:

using a falling edge of the signal to be transmitted as said starting the counting of time at said activating edge; and using a falling edge of the received signal as said deactivating edge.

22. A module to be used in a system comprising a loudspeaker system comprising a woofer installed in a housing, said woofer comprising a sound producing unit, an ultrasonic audio transmitter for transmitting an ultrasonic audio signal; and an ultrasonic audio receiver for receiving the ultrasonic audio signal, said module comprising:

a position detection unit for determining the position of the sound producing unit based on a phase difference between the received ultrasonic audio signal and the ultrasonic audio signal transmitted from the transmitter, said phase difference being dependent on a length of a signal path between the transmitter and the receiver; and a control unit for adjusting a spring constant effecting to the sound producing unit of the woofer on the basis of the determined position.

23. A computer program product, comprising:

a non-transitory computer readable medium; and computer code recorded on the computer readable medium and executable by a processor for adjusting a response of a loudspeaker system comprising a woofer installed in a housing, said woofer comprising a sound producing unit, the computer code for transmitting an ultrasonic audio signal with an ultrasonic audio transmitter;

receiving the ultrasonic audio signal with an ultrasonic audio receiver;

determining with a position detection unit the position of the sound producing unit based on a phase difference between the received ultrasonic audio signal and the transmitted ultrasonic audio signal, said phase difference being dependent on a length of a signal path between the transmitter and the receiver; and adjusting a spring constant effecting to the sound producing unit of the woofer on the basis of the determined position.

24. The computer program product according to claim 23, wherein the computer code is further for linearizing the operation of the woofer on the basis of the measurement of the position of the woofer cone.

25. The computer program product according to claim 24, wherein the computer code for linearizing the operation of the woofer comprises computer code for adjusting one or more of the following parameters:

the Bl parameter, or the compliance.

26. The computer program product according to claim 24, wherein the computer code for linearizing the operation of the woofer comprises computer code for adjusting at least one parameter which depends on the position, the velocity or the acceleration of the sound producing unit f the woofer.

* * * * *